Jan. 30, 1968  S. PAPETTI  3,366,656

BIS ORGANOHALOSILYL CARBORANES AND NEOCARBORANES

Filed Sept. 20, 1963

FORMULA I

FORMULA II

○ BORON

◉ CARBON

○ HYDROGEN ON CARBON
(HYDROGEN ATOMS ON
BORON OMITTED FOR
CLARITY)

INVENTOR.
STELVIO PAPETTI
BY Walter D. Hunter

AGENT

United States Patent Office 3,366,656
Patented Jan. 30, 1968

3,366,656
BIS ORGANOHALOSILYL CARBORANES AND NEOCARBORANES
Stelvio Papetti, Hamden, Conn., assignor to Olin Mathieson Chemical Corporation, a corporation of Virginia
Filed Sept. 20, 1963, Ser. No. 310,379
7 Claims. (Cl. 260—448.2)

ABSTRACT OF THE DISCLOSURE

Organoboron compounds are prepared by reacting a compound of the formula $RR'B_{10}H_8[C(H)C(H)]$, where R and R' are hydrogen or alkyl, successively with an alkali metal alkyl or aryl and an alkyl or aryl substituted halosilane, such as dichloro diphenyl silane, at a temperature of about $-90°$ C. to about $+50°$ C.

---

Figure 1:
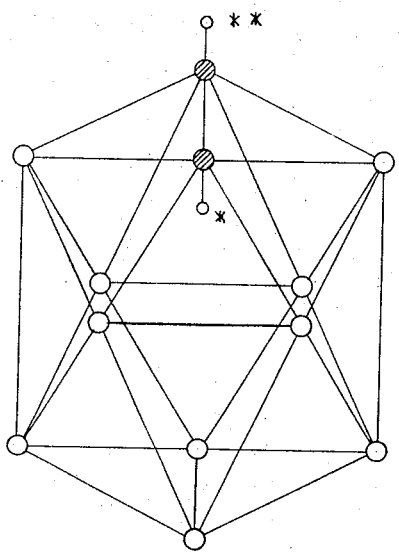
Figure 1:
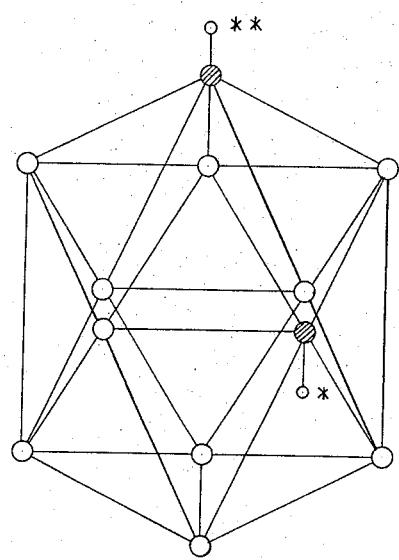

This invention relates to silicon-containing organoboron compounds and to a process for their preparation. The novel compounds are prepared by reacting an organoboron compound of the class:

$$RR'B_{10}H_8[C(H)C(H)]$$

wherein R and R' are each selected from the group consisting of hydrogen and an alkyl radical containing from 1 to 5 carbon atoms, successively with an alkali metal alkyl or aryl and a silane of the formula:

$$R''_nSiX_{(4-n)}$$

wherein $n$ is an integer of from 0 to 3 inclusive, R'' is selected from the group consisting of an alkyl radical containing from 1 to 5 carbon atoms or an aryl radical containing not more than 10 carbon atoms and X is a halogen, said halogen being selected from the group consisting of chlorine, bromine and iodine.

The novel silicon-containing organoboron compounds of this invention have the formula:

$$RR'B_{10}H_8[C(SiR''_nX_{(3-n)})]_2$$

wherein R, R', R'', X and $n$ have the same meaning as described previously.

Compounds of the above class can be prepared by the reaction of decaborane or an alkylated decaborane having 1 to 2 alkyl groups containing 1 to 5 carbon atoms in each alkyl group with an acetylenic hydrocarbon containing from 2 to 10 carbon atoms in the presence of a wide variety of ether, nitriles or amines. The preparation of these compounds is described in application Ser. No. 741,967, filed June 13, 1958 of Ager, Heying and Mangold, now abandoned. For example, the compound carborane ($B_{10}H_{10}[C(H)C(H)]$) can be prepared by reacting for about 12 hours at 125° C. a mixture of decaborane and tetrahydrofuran in an autoclave pressured to 100 p.s.i. with acetylene.

The preparation of decaborne is known in the art. Lower alkyls of decaborane such as monomethyldecaborane, dimethyldecaborane, monoethyldecaborane, diethyldecaborane, monopropyldecaborane and the like, can be prepared, for example, according to U.S. Patent 2,999,117 of Altwicker, Garrett, Weilmuenster and Harris.

The solid products prepared in accordance with the method of this invention, when incorporated with suitable oxidizers such as ammonium perchlorate, potassium perchlorate, sodium perchlorate, ammonium nitrate and the like, yield solid propellants suitable for rocket power plants and other jet propelled devices. Such propellants burn with high flame speeds, have high heats of combustion and are of the high specific impulse type. The solid products of this invention when incorporated with oxidizers are capable of being formed into a wide variety of grains, tablets and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

In the first stage of the process the ratio of the reactants can be varied widely, generally being within the range of from about 2.0 to about 10 moles or more of the alkali metal alkyl or aryl per mole of the organoboron compound employed and preferable in the range of from about 2 to about 5 moles of the alkali metal alkyl or aryl per mole of the organoboron compound utilized. The temperature of the reaction of the organoboron compound with the alkali metal alkyl or aryl generally is maintained between about $-90°$ C. and $50°$ C. and preferably at or below room temperature. Although atmospheric pressure reactions are convenient, subatmospheric pressures up to pressures of about 5 atmospheres or more can be employed, if desired. The reaction of the alkali metal alkyl or aryl compound with the organoboron compound is substantially instantaneous. In order to prevent overheating, the slow addition of the alkali metal alkyl compound or aryl compound to the reaction mixture is practiced.

The amount of the silane employed in the second stage of the novel process of this invention can also be varied widely, and generally will be from not less than 2 moles of the silane compound up to about 10 moles or more per mole of the organoboron compound charged to the initial step of the reaction, Preferably from about 2.0 to about 4.0 moles of the silane will be utilized per mole of the organoboron compound added to the reactor in the initial step. The pressure employed in the second phase of the reaction can be varied widely, although atmospheric pressure reactions are convenient. In the second phase the reaction temperature is maintained at between about $-90°$ and about $+50°$ C. with the preferred temperature being from about $-50°$ and $+40°$ C.

Recovery of the silicon-containing organoboron product can be conveniently accomplished by first filtering the reaction mixture followed by evaporation of the filtrate to dryness. The crude product thus obtained can be recrystallized from a wide variety of solvents such as petroleum ether, heptane, hexane, pentane, benzene etc. to yield the pure product.

The reaction can be carried out in a wide variety of inert solvents other than the diethyl ether employed in the specific examples. Such solvents include, for example, dimethyl ether, diethyl ether, methyl ethyl ether, diisopropyl ether, di-n-propyl ether, ethyl-n-butyl ether, ethylene glycol dimethyl ether, dioxane and tetrahydrofuran.

The reaction time (total) generally will vary from about 0.5 to about 20 hours or more depending upon the reaction conditions employed.

Silanes suitable as starting materials for the process of this invention include, for example, methyl trichlorosilane, isopropyl trichlorosilane, amyl trichlorosilane, phenyl trichlorosilane, xylyl trichlorosilane, dimethyl dichlorosilane, diethyl dichlorosilane, diphenyl dichlorosilane, ditolyl dichlorosilane, dixylyl dichlorosilane, trimethyl chlorosilane, tri-n-butyl chlorosilane, triphenyl chlorosilane, trixylyl chlorosilane, triamyl chlorosilane, tetrachlorosilane, and the corresponding bromine and iodine derivatives.

The preferred alkali metal alkyls are the lithium alkyls such as methyl lithium, ethyl lithium, isopropyl lithium, n-propyl lithium, n-butyl lithium, sec-butyl lithium, t-butyl lithium, n-amyl lithium and the like, since they are soluble in the inert organic solvents employed. Other alkali metal alkyls, such as sodium and potassium, can also be employed as can the alkali metal aryls including phenyl lithium.

When organoboranes (i.e. carboranes) of the class:

$$RR'B_{10}H_8[C(H)C(H)]$$

wherein R and R' are each selected from the group consisting of hydrogen and an alkyl radical containing from 1 to 5 carbon atoms are heated to a temperature of above 400° C. a thermal isomerization takes place and the so-called neocarboranes are formed. For example, the compound carborane ($B_{10}H_{10}[C(H)C(H)]$) can be converted to neocarborane by heating in a sealed tube at a temperature of about 475° C. for 5 to 20 hours. The structural formula of the compound carborane is shown as structural Formula I in FIGURE 1 while the structural formula of the compound neocarborane is shown as structural Formula II in FIGURE 1. In the process of this invention neocarboranes as well as carboranes can be utilized as starting materials.

This invention is illustrated in detail by the following examples which are to be considered not limitative.

In the examples the term "moles" signifies "gram moles."

*Example I.—Bis(chloro dimethylsilyly) carborane (A)*

A slurry prepared by reacting 50.0 g. (0.347 mol.) carborane with 0.762 mole of butyl lithium in ether at a temperature of 0° C. was slowly added to a stirred solution of 98.33 g. (0.762 mol.) of dichloro dimethylsilane in diethyl ether cooled by means of an ice bath. When addition was complete, the mixture was refluxed overnight and then filtered. The filtrate was evaporated to dryness, the residue sublimed under vacuum at a bath temperature of 125–130° C. and the sublimate was recrystallized from heptane. Bis(chloro dimethylsilyl) carborane (M.P. 112.5–113.5° C.) was recovered in 88 percent yield.

*Analysis.*—Calc'd for $C_6H_{22}B_{10}Cl_2Si_2$: C, 21.84; H, 6.86; B, 32.79; Cl, 21.49; Si, 17.02. Found: C, 22.05; H, 6.67; B, 32.57; Cl, 21.15; Si, 16.79.

*Example II.—Bis(chloro diphenylsilyl) carborane (B)*

The procedure of Example I was followed using 15.35 g. (0.106 mol.) of carborane, 0.234 mole of butyl lithium and 59.3 g. (0.234 mol.) of dichloro diphenylsilane. The sublimation was omitted and a 22.7 percent yield of bis (chloro diphenylsilyl) carborane (M.P. 244–245° C.) was obtained directly by recrystallization from heptane.

*Analysis.*—Calc'd for $C_{26}H_{30}B_{10}Cl_2Si_2$: C, 54.05; H, 5.23; B, 18.12; Cl, 12.26; Si, 9.73. Found: C, 53.80; H, 5.13; B, 18.80; Cl, 12.15; Si, 9.27.

*Example III.—Bis(dichloromethylsilyl) carborane (C)*

This compound was prepared in the same manner as the product of Example II but from 21.6 g. (0.150 mol.) of carborane, 0.333 mole of butyl lithium and 49.7 g. (0.333 mol.) of methyl trichlorosilane. A 69.5 percent yield of bis(chloro methylsilyl) carborane (M.P. 110–120° C.) was recovered from recrystallization from 30–60° petroleum ether.

*Analysis.*—Calc'd for $C_4H_{16}B_{10}Cl_4Si_2$: C, 12.97; H, 4.35; B, 29.22; Cl, 38.29; Si, 15.17. Found: C, 13.10; H, 4.34; B, 29.30; Cl, 38.35; Si, 14.75.

*Example IV.—Bis(trichlorosilyl) carborane (D)*

The procedure of Example II was followed using 15.87 g. (0.11 mol.) of carborane, 0.242 mole of butyl lithium and 41.15 g. (0.242 mol.) of tetrachlorosilane. The crude product was recrystallized from heptane to give a 60 percent yield of bis(trichlorosilyl) carborane (M.P. 121–122° C.).

*Analysis.*—Calc'd for $C_2H_{10}B_{10}Cl_6Si_2$: C, 5.85; H, 2.43; B, 26.31; Cl, 51.74; Si, 13.67. Found: C, 5.75; H, 2.51; B, 26.61; Cl, 51.35; Si, 13.17.

*Example V.—Bis(chloro dimethylsilyl) neocarborane (E)*

Approximately 6 grams of carborane $$(B_{10}H_{10}[C(H)C(H)])$$

was sealed in a 1″ x 12″ heavy walled combustion tube and heated in a furnace at a temperature of 470°–480° C. for about 10 hours. The tube was opened and the neocarborane product was removed by extraction with ethyl ether. The resulting extract was evaporated to dryness and the residue sublimed to yield a product (melting point 263.5–265.5° C.) which was identified by infrared analysis as neocarborane.

A solution of dilithionecarborane was prepared by reacting 0.0271 mole of neocarborane and 0.596 mole of butyl lithium in diethyl ether. The dilithionecarborane solution was treated with an excess of dry hexane and the dilithionecarborane which precipitated was recovered by filtration, washed with additional hexane and finally redissolved in diethyl ether.

The resulting dilithionecarborane was added to a stirred solution of 7.74 g. (0.0596 mole) of dichloro dimethylsilane cooled by an ice bath. After the mixture had been refluxed for 3.5 hours, it was filtered to remove insoluble materials. In the next step the ether was removed from the filtrate under reduced pressure and the residue was distilled under vacuum yielding bis(chloro dimethylsilyl) neocarborane, B.P. 98°–100° (0.1 mm.).

*Analysis.*—Calc'd for $C_6H_{22}B_{10}Cl_2Si_2$: C, 21.84; H, 6.86; B, 32.79; Cl, 21.49. Found: C, 22.30; H, 6.88; B, 32.67; Cl, 21.40.

*Example VI.—Bis(chloro diethylsilyl) carborane (F)*

A dilithiocarborane slurry was prepared from 15.0 g. (0.104 mol.) carborane and 0.228 mol. of butyl lithium in ether and slowly added to a stirred, ethereal solution of 35.0 g. (0.228 mol.) dichloro diethylsilane cooled by means of an ice-bath. After the addition had been completed the mixture was refluxed overnight and filtered. The filtrate was evaporated to dryness and the liquid residue distilled under vacuum. The fraction which distilled at 155–157° C. at 0.1 mm. solidified on standing to a wet crystalline solid.

The crude product was crystallized from low boiling petroleum ether yielding a solid product (Compound F), M.P. 38°–39° C.

*Analysis.*—Calc'd for $C_{10}H_{30}B_{10}Cl_2Si_2$: C, 31.12; H, 7.83; B, 28.09; Cl, 18.40. Found: C, 31.31; H, 7.94; B, 28.04; Cl, 18.75.

The compound of the formula:

$$B_{10}H_{10}[C(SiCl(CH_3)_2)]_2$$

prepared in Example I (Compound A) has the same structural formula as structural Formula I in FIGURE 1 with the exception that the hydrogen atoms indicated by the single and double asterisks are each replaced by the radical —$SiCl(CH_3)_2$.

The compound of the formula:

$$B_{10}H_{10}[C(SiCl(C_6H_5)_2)]$$

prepared in Example II (Compound B) has the same structural formula as structural Formula I shown in FIGURE 1 with the exception that the hydrogen atoms indicated by the single and double asterisks are each replaced by the radical —$SiCl(C_6H_5)_2$.

The compound of the formula:

$$B_{10}H_{10}[C(SiCl_2CH_3)]_2$$

prepared in Example III (Compound C) has the same structural formula as structural Formula I given in FIGURE 1 with the exception that the hydrogen atoms indicated by the single and double asterisks are each replaced by the radical —SiCl$_2$CH$_3$.

The compound of the formula:

$$B_{10}H_{10}[C(SiCl_3)]_2$$

prepared in Example IV (Compound D) has the same structural formula as structural Formula I shown in FIGURE 1 with the exception that the hydrogen atoms indicated by the single and double asterisks are each replaced by the radical —SiCl$_3$.

The compound of the formula:

$$B_{10}H_{10}[C(SiCl(CH_3)_2)]_2$$

prepared in Example V (Compound E) has the same structural formula as structural Formula II in FIGURE 1 with the exception that the hydrogen atoms indicated by the single and double asterisks are each replaced by the radical —SiCl(CH$_3$)$_2$.

The compound of the formula:

$$B_{10}H_{10}[C(SiCl(C_2H_5)_2)]_2$$

prepared in Example VI (Compound F) has the same structural formula as structural Formula I shown in FIGURE 1 with the exception that the hydrogen atoms indicated by the single and double asterisks are each replaced by the radical —SiCl(C$_2$H$_5$)$_2$.

The solid silicon-containing organoboron compounds produced by practicing the process of this invention can be employed as ingredients of solid propellant compositions in accordance with general procedures which are well understood in the art, inasmuch as the solids produced by practicing the present process are readily oxidized using conventional solid oxidizers such as ammonium perchlorate, potassium perchlorate, sodium perchlorate, ammonium nitrate and the like. In formulating a solid propellant composition employing one of the materials produced in accordance with the present invention, generally from 10 to 35 parts by weight of the oxidizer are used. In the propellant, the oxidizer and the product of the present process are formulated in admixture with each other by finely subdividing each of the materials and thereafter intimately mixing them. The purpose of doing this, as the art is well aware, is to provide proper burning characteristics in the final propellant. In addition to the oxidizer and the oxidizable material, the final propellant can also contain an artificial resin, generally of the urea-formaldehyde or phenol-formaldehyde type. The function of the resin is to give the propellant mechanical strength and at the same time improve its burning characteristics.

Thus, in the manufacture of a suitable propellant, proper proportions of finely divided oidizer and finely divided silicon-containing organoboron compound can be admixed with a high solids content solution of partially condensed urea-formaldehyde or phenol-formaldehyde resin, the proportions being such that the amount of resin is about 5 to 10 percent by weight based upon the weight of oxidizer and the boron compound. The ingredients can be thoroughly mixed with simultaneous removal of solvent, and following this the solvent free mixture can be molded into the desired shape as by extrusion. Thereafter, the resin can be cured by resorting to heating at moderate temperatures. For further information concerning the formulation of solid propellant compositions, reference is made to U.S. Patent 2,622,277 to Bonnell and to U.S. Patent 2,646,596 to Thomas.

What is claimed is:

1. Silicon-containing organoboron compounds of the formula:

$$RR'B_{10}H_8[C(SiR''_nX_{(3-n)})]_2$$

wherein R and R' are each selected from the group consisting of hydrogen and an alkyl radical containing 1 to 5 carbon atoms, R'' is selected from the group consisting of an alkyl radical containing from 1 to 5 carbon atoms and an aryl radical containing not more than 10 carbon atoms, X is a halogen selected from the group consisting of chlorine, bromine and iodine and $n$ is an integer of from 0 to 3 inclusive.

2. Bis(chloro dimethylsilyl) carborane.
3. Bis(dichloro methylsilyl) carborane.
4. Bis(chloro diphenylsilyl) carborane.
5. Bis(trichlorosilyl) carborane.
6. Bis(chloro diethylsilyl) carborane.
7. Bis(chloro dimethylsilyl) neocarborane.

References Cited

UNITED STATES PATENTS

| | | | | |
|---|---|---|---|---|
| 2,386,452 | 10/1945 | Fleming | | 260—448.2 |
| 2,927,004 | 3/1960 | Girardot | | 260—448.2 |
| 2,974,157 | 3/1961 | Jex | | 260—448.2 |
| 3,137,719 | 6/1964 | Papetti | | 260—448.2 |
| 3,137,734 | 6/1964 | Cox et al. | | 260—606.5 |

TOBIAS E. LEVOW, *Primary Examiner.*

HELEN M. McCARTHY, *Examiner.*

P. F. SHAVER, *Assistant Examiner.*